United States Patent [19]

Gigioli, Jr.

[11] Patent Number: 5,745,226
[45] Date of Patent: Apr. 28, 1998

[54] PASSIVE OPTICAL VELOCITY MEASUREMENT DEVICE AND METHOD

[75] Inventor: George W. Gigioli, Jr., Andover, Mass.

[73] Assignee: Litton Systems, Inc., Woodland Hills, Calif.

[21] Appl. No.: 743,523

[22] Filed: Nov. 4, 1996

[51] Int. Cl.⁶ .................................. G01P 3/36; G01C 3/08
[52] U.S. Cl. ...................................... 356/28; 356/4.06
[58] Field of Search ................................ 356/4.06, 28

[56] References Cited

U.S. PATENT DOCUMENTS

| | | | |
|---|---|---|---|
| 2,942,119 | 6/1960 | King et al. | 356/28 |
| 3,057,071 | 10/1962 | Sinn et al. | 356/28 |
| 3,059,521 | 10/1962 | Clemens et al. | 356/28 |
| 3,706,494 | 12/1972 | Gardner | 356/28 |
| 3,899,251 | 8/1975 | Frenk et al. | 356/28 |
| 5,180,921 | 1/1993 | Moreau et al. | 250/554 |

FOREIGN PATENT DOCUMENTS

| | | | |
|---|---|---|---|
| 2235020-B2 | 1/1974 | Germany | 356/28 |
| 3830417-A | 3/1989 | Germany | 356/28 |

*Primary Examiner*—Stephen C. Buczinski
*Attorney, Agent, or Firm*—Michael H. Wallach

[57] ABSTRACT

An optical velocity measuring device includes a pair of V/H sensors effectively located at two different distances from a moving object. Each sensor is used to determine an image velocity and a corresponding angular velocity of the object. The angular velocity measurements and the difference in distance or optical path length of the individual sensors are used to determine the absolute linear tangential speed of the object without determining the absolute distance to the object.

13 Claims, 10 Drawing Sheets

PASSIVE OPTICAL VELOCITY MEASUREMENT DEVICE AND METHOD

BACKGROUND OF THE INVENTION

Optical sensors used to determine velocity of moving objects and scenes have been developed in various configurations. For example, laser doppler systems are used to determine object velocity along the line of sight of the system. Sensors have also been developed to determine velocity transverse to the line of sight. These sensors commonly form an image of the moving object on an image plane. The linear velocity at which the image moves across the image plane is measured to determine the angular velocity of the moving object. The product of the angular velocity and the distance from the sensor to the object yields the linear velocity of the object transverse to the line of sight of the sensor. These velocity sensors are commonly referred to as "V/H sensors" since the angular velocity of the moving object is the quotient of the linear velocity v and the distance h between the image plane and the object. It can readily be seen that a significant drawback to prior V/H sensors is that the distance to the moving target must be known in order to determine its absolute velocity.

SUMMARY OF THE INVENTION

The present invention is directed to a device and method for determining velocity of moving objects without determining the distance to the objects. The device of the invention includes a first sensor which receives light from the object along a first optical path having a first optical path length. The first sensor generates a first angular velocity measurement or signal indicative of the angular velocity of the object relative to the first sensor. A second sensor receives light from the object along a second optical path having a second optical path length and generates a second angular velocity measurement or signal indicative of the angular velocity of the object relative to the second sensor. A differential optical path length is defined by the difference between the first optical path length and the second optical path length. Using the first and second angular velocity measurements and the differential optical path length, an absolute velocity of the object is computed.

The invention utilizes the concept of the V/H sensor but eliminates the need to determine distance to the object by using multiple sensors, each of which is effectively at a different distance from the moving object. Each sensor is used to compute an angular velocity of the moving object relative to itself. Each angular velocity is related to the actual linear tangential velocity of the object by its respective sensor's distance from the object, or, equivalently, the optical path length followed by the light from the object to the particular sensor. The velocity of the object is computed using the angular velocities and the differential optical path length. Thus, the actual distance to the target need not be known. Only the difference in distance or optical path length between the individual sensors need be known to perform the measurement.

In one embodiment of the invention, the multiple sensors have coincident fields of view. That is, the sensors receive light from the same region of the object or scene. In this embodiment, the light from the object enters the device through a single aperture. The difference in optical path length is achieved by using a pair of polarizing beamsplitters. The light strikes the first beamsplitter which separates the light into two channels based on the polarization of the light. Light of a first channel is reflected by the beamsplitter off the original optical path to a pair of fold mirrors which return the light to a second beamsplitter where it is reflected back to the path followed by light of a second channel. Thus the light of the first channel follows a longer optical path than the light of the second channel.

After the two channels are recombined, the combined light is focused through a diffractive optic such as a ronchi grating or ruling or a pair of parallel slits. The light is then directed onto the pair of optical detectors by another polarizing beamsplitter. Light having polarization of the first channel is directed to the first channel detector, and light of the second channel polarization is directed to the second channel detector.

If a ronchi ruling is used, then the frequency of the output signals from the detectors is proportional to the velocity at which images pass the detectors. The output signals from the detectors are routed to a processing device which determines the frequency of the signals. The processing system can include an FM demodulator, a spectrum analyzer, a frequency counter or other frequency-sensitive device to determine the frequency of the signals along with a computer or other device capable of performing mathematical computations. The frequency of each signal is determined and a corresponding image velocity is computed. The angular velocity associated with this image velocity is computed from the known geometry of the sensor. Thus, two angular velocity measurements, one for each channel, are obtained.

If a pair of parallel slits is used, then the detector for each channel actually includes a pair of optical detectors, with each detector of a pair receiving light from one of the slits. As the image moves by the slits, the individual signals from the two detectors of a pair are separated by a delay. The amount of delay is inversely proportional to the velocity at which the image moves by the slits. By measuring the delay for each channel, two image velocity measurements are obtained and are converted to two angular velocity measurements using the known geometry of the sensors.

The velocity sensing apparatus of the invention has substantial advantages over prior velocity sensing devices as indicated above. The sensing apparatus of the invention does not require that the distance to the moving target be known in order to determine its velocity. Also, the use of the polarizing beamsplitters and fold mirrors allows the differential optical path length to be realized without duplicate optical elements. Minor fluctuations in elements which could cause inaccuracies in the velocity measurement are eliminated. Also, the coincident field of view of the channels prevents minor fluctuations in object distance and speed from introducing errors into the measurement.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
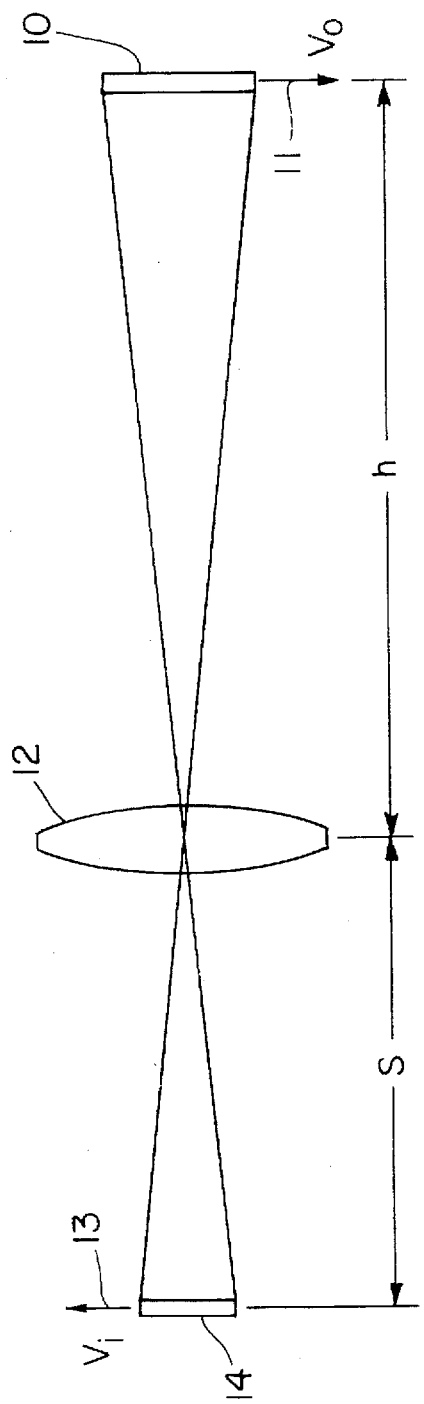
FIG. 1 schematically illustrates the operation of a prior art V/H sensor.

FIG. 1 schematically illustrates the operation of a prior art V/H sensor. Light from an object 10 is imaged by a lens 12 to form an image 14. The object moves at a velocity $v_0$ in the direction indicated by arrow 11, and the image moves in the image plane at a velocity $v_i$ in the direction indicated by arrow 13. The angular velocity $v_a$ at which the image moves is given by $$v_a = \frac{v_i}{s} . \qquad (1)$$

The image velocity $v_i$ can be measured by use of optical elements such as gratings, detectors, etc. to be described in detail below. The distance s between the lens 12 and the image plane is known from the geometry of the sensor. Therefore, the angular velocity $v_a$ can be calculated from the image velocity measurement.

Clearly, the angular velocity $v_a$ of the image 14 in the image plane is the same as the angular velocity of the object 10. The linear object velocity $v_0$ is given by $$v_0 = h v_a . \qquad (2)$$

Since $v_a$ has been determined as described above, if the distance h to the object 10 is known, then the linear velocity $v_0$ at which the object 10 is moving can be determined from equation 2. However, if the distance h is not known, then the object velocity $v_0$ cannot be determined by this single V/H sensor.

Figure 2:
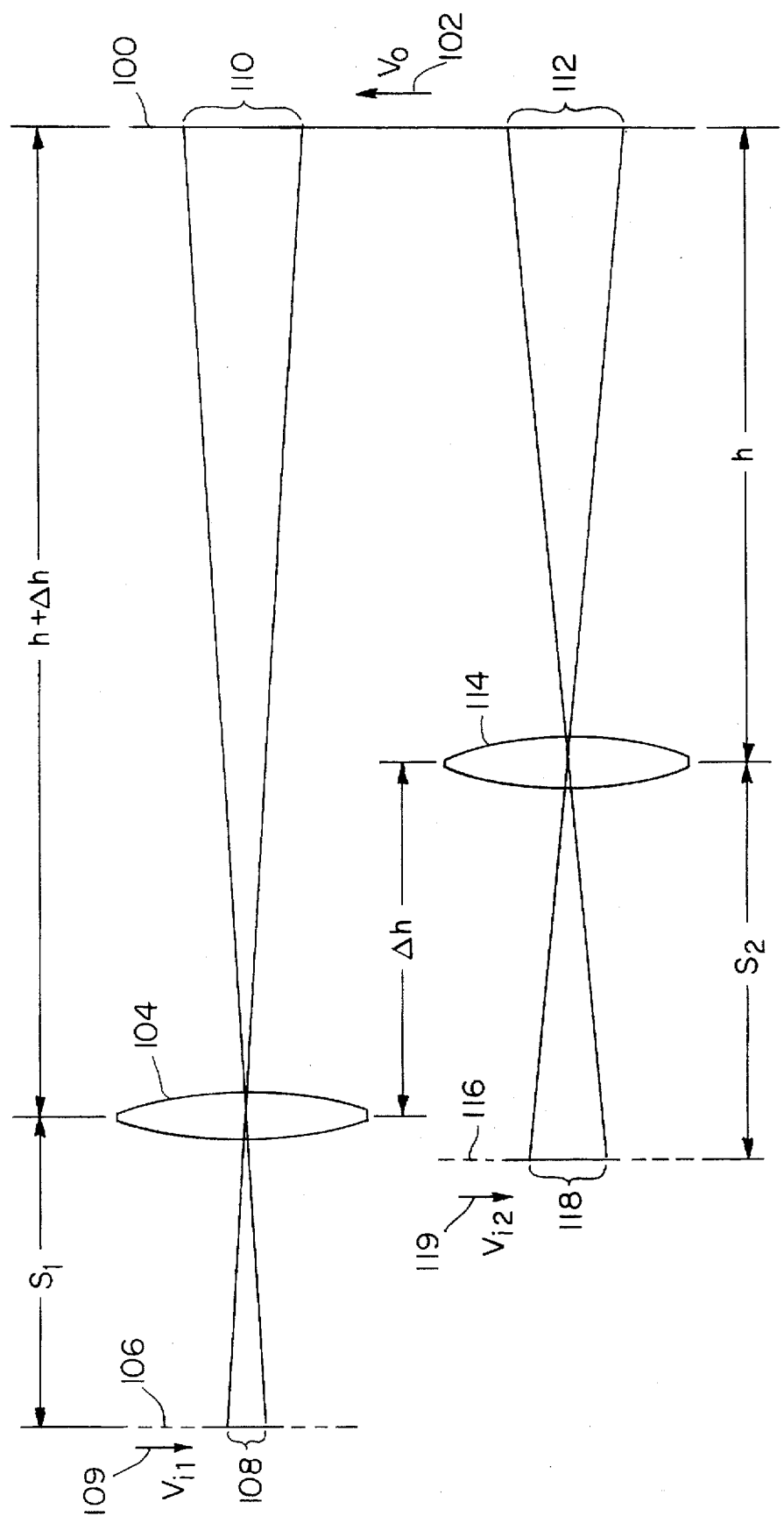
FIG. 2 schematically illustrates the operation of the velocity sensing apparatus of the invention using two V/H sensors.

FIG. 2 schematically depicts operation of the velocity sensor of the present invention using a pair of V/H sensors. An object or scene 100 moves at a velocity $v_0$ in the direction indicated by arrow 102. Light from a first portion 110 of the scene 100 is imaged by lens 104 onto an image plane 106. The image 108 so formed moves at a velocity $v_{i1}$ in the direction of the arrow 109. Light from a second portion 112 of the object 110 is imaged by lens 114 onto an image plane 116. The image 118 moves at a velocity $v_{i2}$ in the direction of arrow 119. Lens 114 is located a distance h from the object 100, and lens 104 is located a distance h +Δh from the object 100, with the differential distance between lenses 104 and 114 being equal to Δh. Because of the differential distance, each sensor will compute a different object angular velocity $v_a$. For the two sensors shown in FIG. 2, $$v_{a2} = \frac{v_{i2}}{s_2} = \frac{v_0}{h} , \text{ and} \qquad (3)$$

$$v_{a1} = \frac{v_{i1}}{s_1} = \frac{v_0}{h + \Delta h} ; \qquad (4)$$

where $v_{a1}$ is the angular velocity of the image 108 and the portion 110 of the object 100, and $v_{a2}$ is the angular velocity of the image 118 and the portion 112 of the object 100. Since $$v_{a1} = \frac{v_0}{h + \Delta h} \text{ and} \qquad (5)$$

$$v_{a2} = \frac{v_0}{h} ; \qquad (6)$$

equations 5 and 6 can be combined to obtain $$v_0 = \left[ \frac{v_{a1} v_{a2}}{(v_{a2} - v_{a1})} \right] \Delta h. \qquad (7)$$

The angular velocities $v_{a1}$ and $v_{a2}$ are known from equations 3 and 4 and Δh is known from the geometry of the sensors. Therefore, the absolute linear velocity $v_0$ of the object is determined without measuring the absolute distance h to the object 100.

Figure 3:
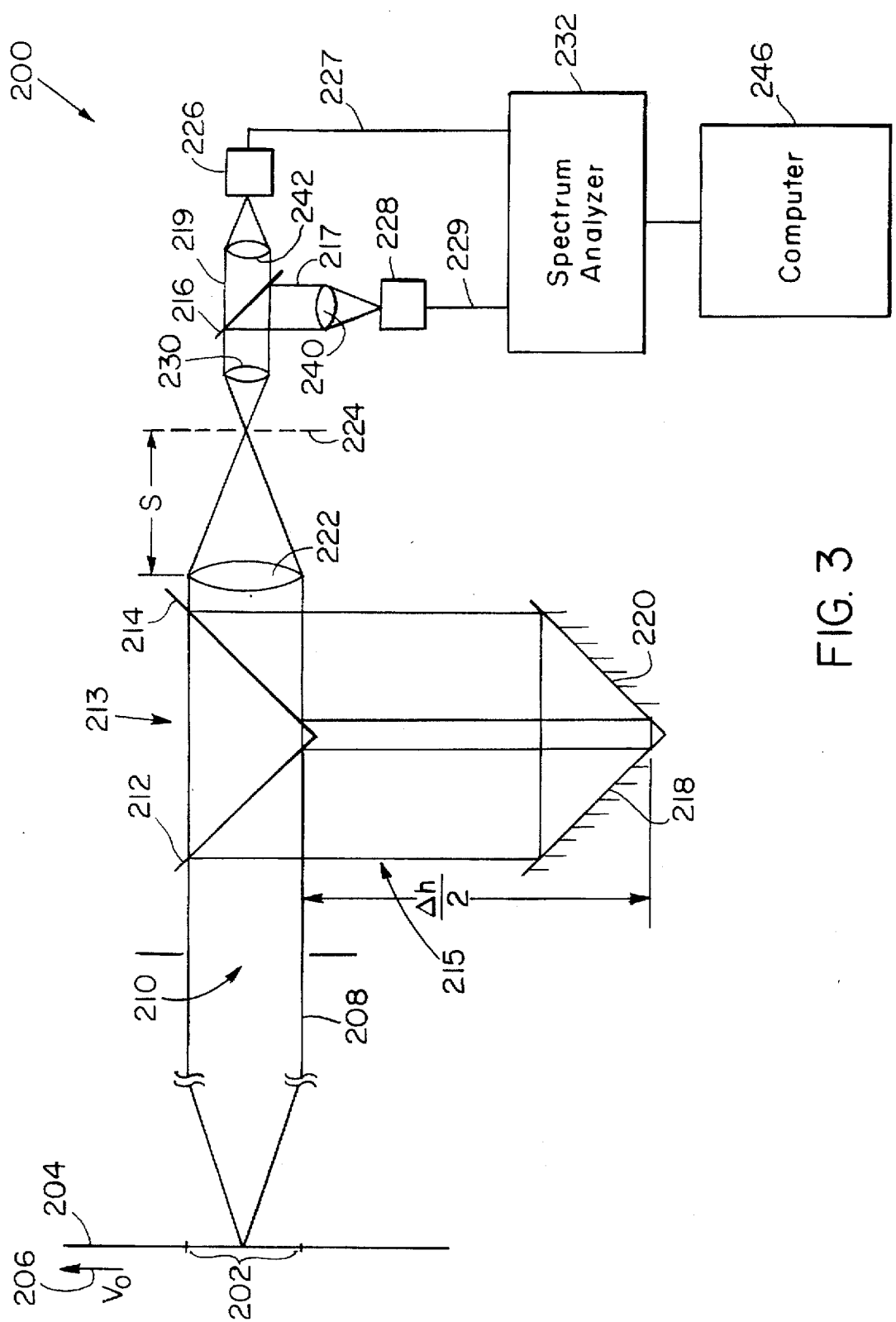
FIG. 3 is a schematic block diagram of an embodiment of the velocity sensing apparatus of the invention.

FIG. 3 is a schematic illustration of a preferred embodiment of the velocity sensor 200 of the present invention. In this embodiment, light 208 from a portion 202 of a moving scene 204 enters the velocity sensing system 200 through an aperture 210. The scene 204 is assumed to be moving at a velocity $v_0$ in the direction of the arrow 206. It should be noted that the light 208 entering the system 200 is shown by nearly parallel beams. The light beams entering the system are nearly parallel because of the relative distance to the object 202. A break is shown in the light 208 to show that light entering the system actually diverges from separate points on the object 202. One skilled in the art would understand that this is true to allow an image to be formed at the grating 224.

In this embodiment, the light from the scene is split into two channels, arbitrarily referred to herein as channel 1 and channel 2. The light 208 upon entering the system 200 first strikes a polarizing beamsplitter 212. A portion 213 of the light passes through the beamsplitter 212 and becomes the light of channel 2. The channel 1 light is a second portion 215 of the incoming light 208 which is reflected by the beamsplitter 212 toward a fold mirror 218. The channel 1 light then strikes fold mirror 220 and returns to a second polarizing beamsplitter 214 where it rejoins the light of channel 2. Thus, the beamsplitters 212, 214 and the mirrors 218 and 220 introduce additional optical path length for the optical path followed by the light of channel 1. The difference in optical path length is referred to herein as Δh.

The recombined light of channels 1 and 2 is then focused by lens 222 onto a diffraction grating or ruling 224 at the image plane of the lens 222 a distance s from the lens 222. Light out of the grating 224 is collimated by lens 230. The collimated light then strikes a third polarizing beamsplitter 216 which again splits the light into its separate channels. The channel 1 light 217 is focused by lens 240 onto detector 228. The channel 2 light 219 is focused by lens 242 onto optical detector 226.

The optical detectors 226 and 228 generate electrical signals indicative of the intensity of the light received by them. The signal generated by detector 226 is transmitted via electrical signal line 227 to a frequency sensitive measuring device 232 such as a spectrum analyzer, and the signal generated by detector 228 is transmitted via electrical signal line 229 to the spectrum analyzer 232. It will be understood that the device 232 need not be a spectrum analyzer but can also be a frequency counter, an oscilloscope or any other measuring device capable of rendering a frequency measurement.

Where the intensity of light from the scene has a spatial frequency close to the ruling frequency of the grating 224, each detector 226 and 228 produces a sinusoidal electrical signal on lines 227 and 229, respectively. The frequency of the sinusoidal signal is proportional to the velocity at which images from the scene 204 move along the image plane of the lens 222. Therefore, each detector signal frequency can be converted to a linear image velocity. Since the distance s between the grating 224 and the lens 222 is known, the angular velocities $v_{a1}$ and $v_{a2}$ can be computed, where $v_{a1}$ and $v_{a2}$ are the angular velocities computed from the linear image velocities determined for channel 1 and channel 2, respectively. The angular velocities can then be substituted into equation 7 to determine the linear velocity $v_0$ of the scene 204. The computation of velocity $v_0$ from the measured frequencies can be done manually by a user reading the frequencies from the frequency measuring device 232. Alternatively, the device 232 can be coupled to a processing device such as computer 246 which performs the required computation.

The individual channels in the sensor of FIG. 3 have a substantial portion of their optical paths in common. Additionally, the two channels have coincident fields of view which enable the sensor 200 to view a single region 202 of the moving scene. The use of common optics and grating avoids any bias errors due to differences in lens performance, image distances or grating frequencies. The use of a coincident field of view also eliminates errors caused by variation in height in the scene. Since both channels view the same region, small fluctuations in height as the scene moves do not introduce errors into the calculation. The fluctuations are effectively cancelled since both channels view the same height variations.

As described above, the velocity sensor of the invention works by using two transmission grating V/H sensors. The theory of operation of such sensors and experimental results are described in "Transmission-Grating Velocimetric Technique For Common Objects," by Shu Wing Li and Tadashi Aruga, published in *Applied Optics*, Volume 31, No. 4 on Feb. 1, 1992. The operation of a transmission-grating V/H sensor will now be described in detail. Much of the following description parallels the discussion found in the referenced paper. Changes of variables have taken place and a square-wave transmittance grating is used in the following instead of the sinusoidal grating described in the paper.

There are a number of ways of implementing a V/H sensor as applied to the present invention. In the embodiment described above, a ronchi ruling or grating 224 is placed in the focal plane of a lens 222, with a large area detector behind it. The ruling acts as a spatial frequency filter, passing only the spatial frequency components of the image that are very close to the ruling frequency. The detector collects all of the energy passing through the ruling, converting it to electrical energy. Mathematically, the current out of the detector can be written $$i_{1,2}(t) = \quad (8)$$

$$A_{1,2} \int_{-\infty}^{\infty} \int_{-\infty}^{\infty} E(x - v_{1,2}t, y) T(x,y) rect\left(\frac{x}{W_x}, \frac{y}{W_y}\right) dx dy,$$

where $E(x-v_{1,2}t,y)$ is the time-varying two-dimensional irradiance distribution of the moving image in the image plane of the sensor, $T(x,y)$ is the transmittance function of the ronchi ruling, $W_x$ and $W_y$ are the widths of the grating or the detector (whichever is smaller) in the x and y directions, respectively, and $A_{1,2}$ is a constant that depends on the optics used in the sensor and on the responsivity of the detector. The ronchi ruling transmittance function can be represented by a square wave:

$$T(x,y) = \frac{1}{2} + \frac{2}{\pi}\left[\cos(2\pi f_0 x) - \frac{1}{3}\cos(6\pi f_0 x) + \frac{1}{5}\cos(10\pi f_0 x) - \ldots\right] = \frac{1}{2} + \quad (9)$$

$$\frac{1}{\pi}\left[\exp(i2\pi f_0 x) - \frac{1}{3}\exp(i6\pi f_0 x) + \frac{1}{5}\exp(i10\pi f_0 x) - \ldots\right] +$$

$$\frac{1}{\pi}\left[\exp(-i2\pi f_0 x) - \frac{1}{3}\exp(-i6\pi f_0 x) + \frac{1}{5}\exp(-i10\pi f_0 x) - \ldots\right];$$

where $f_0$ is the fundamental spatial frequency of the ruling. The coordinate system has been chosen such that the x axis is perpendicular to the ruling lines. Now we define $$E_x(x - v_{1,2}t) \equiv \int_{-\infty}^{\infty} E(x - v_{1,2}t, y) rect\left(\frac{y}{W_y}\right) dy, \quad (10)$$

which is the integral in the y-dimension of the image over the width of the field in the y-direction (one may think of summing the columns of pixels in a two-dimensional array to obtain a one-dimensional array). With equation 9, the detector signal then becomes $$i_{1,2}(t) = A_{1,2} \int_{-\infty}^{\infty} E_x(x - v_{1,2}t) \{1/2 + \quad (11)$$

$$\frac{1}{\pi}[\exp(i2\pi f_0 x) - 1/3\exp(i6\pi f_0 x) + \ldots] +$$

$$\frac{1}{\pi}[\exp(-i2\pi f_0 x) - 1/3\exp(-i6\pi f_0 x) + \ldots] \} rect\left(\frac{x}{W_x}\right) dx =$$

$$\frac{A_{1,2}}{2} \int_{-\infty}^{\infty} E_x(x - v_{1,2}t) rect\left(\frac{x}{W_x}\right) dx +$$

$$\frac{A_{1,2}}{\pi} \int_{-\infty}^{\infty} E_x(x - v_{1,2}t) rect\left(\frac{x}{W_x}\right) e^{i2\pi f_0 x} dx -$$

$$\frac{A_{1,2}}{3\pi} \int_{-\infty}^{\infty} E_x(x - v_{1,2}t) rect\left(\frac{x}{W_x}\right) e^{i6\pi f_0 x} dx + \ldots +$$

$$\frac{A_{1,2}}{\pi} \int_{-\infty}^{\infty} E_x(x - v_{1,2}t) rect\left(\frac{x}{W_x}\right) e^{-i2\pi f_0 x} dx -$$

$$\frac{A_{1,2}}{3\pi} \int_{-\infty}^{\infty} E_x(x - v_{1,2}t) rect\left(\frac{x}{W_x}\right) e^{-i6\pi f_0 x} dx + \ldots;$$

which is in the form of a convolution. The Fourier transform of this expression is the temporal frequency spectrum of the detector signal (which is what one would expect to see if one were to feed the detector output into a spectrum analyzer). It is given by $$i_{1,2}(\nu) = \quad (12)$$

$$\frac{A_{1,2}}{2} E_w(\nu) +$$

$$\frac{A_{1,2} W_x}{\pi v_{1,2}} E_x^*\left(\frac{\nu}{v_{1,2}}\right) \left\{ sinc\left[W_x\left(f_0 - \frac{\nu}{v_{1,2}}\right)\right] \right\} +$$

-continued $$\text{sinc}\left[W_x\left(f_0+\frac{v}{v_{1,2}}\right)\right]\right\}-$$

$$\frac{A_{1,2}W_x}{3\pi v_{1,2}}E_x^*\left(\frac{v}{v_{1,2}}\right)\left\{\text{sinc}\left[W_x\left(3f_0-\frac{v}{v_{1,2}}\right)\right]\right.$$

$$+\text{sinc}\left[W_x\left(3f_0+\frac{v}{v_{1,2}}\right)\right]\right\}+$$

$$\frac{A_{1,2}W_x}{5\pi v_{1,2}}E_x^*\left(\frac{v}{v_{1,2}}\right)\left\{\text{sinc}\left[W_x\left(5f_0-\frac{v}{v_{1,2}}\right)\right]\right.$$

$$+\text{sinc}\left[W_x\left(5f_0+\frac{v}{v_{1,2}}\right)\right]\right\}-\cdots$$

The first term in this expression represents the average image irradiance times the area of the image, that is, the dc component of the detector signal. It varies slowly in time as more or less bright objects enter or leave the field of view, and thus has an associated spectrum close to zero frequency. The other terms in the expression are relatively narrow band spectra centered at temporal frequencies equal to the object's velocity times the spatial harmonics of the ronchi ruling. The widths of these spectra are determined by the product of the spatial frequency and the width of the field of view, or, equivalently, by the total number of lines in the ronchi ruling that are within the field of view. A larger number of lines yields a narrower spectrum. In the limit of a very large number of lines, the narrow spectral features approach delta functions.

In the implementation of the V/H sensor, the second term in equation 12 (the fundamental) is the term of interest. All others can be filtered out using an electronic bandpass filter. In the limit of a large number of ruling lines, this term approaches a pair of delta functions, which is the spectrum of a sinusoidal signal. Even with a fairly small number of lines (about 10–20), the detector signal is quasi-sinusoidal, and has a temporal frequency that is proportional to the image velocity. As described above, this image velocity is related to the angular velocity of both the image and the object by the distance s between the focusing lens 222 and the ruling. The fundamental frequencies of the detector signals from both channels are thus measured to obtain the respective channels' angular velocities. Because the difference in optical path length Δh is known, the two angular velocities yield an absolute linear velocity of the object, as previously described. The uncertainty in this measurement is related to the width of the signal spectrum, which, in turn, is inversely proportional to the number of lines in the ruling.

Figure 4:
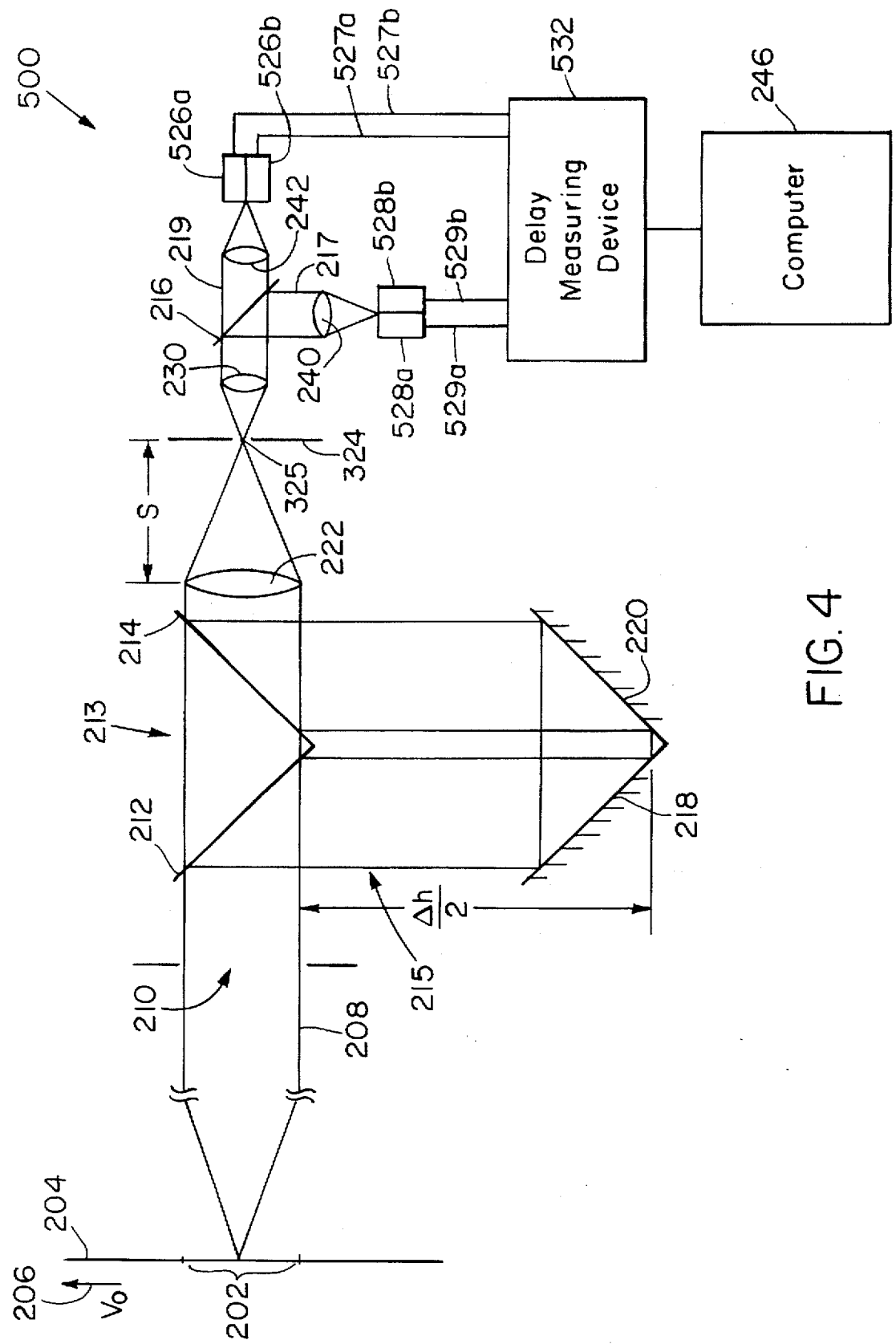
FIG. 4 is a schematic block diagram of another embodiment of the velocity sensing apparatus of the invention.
Figure 5:
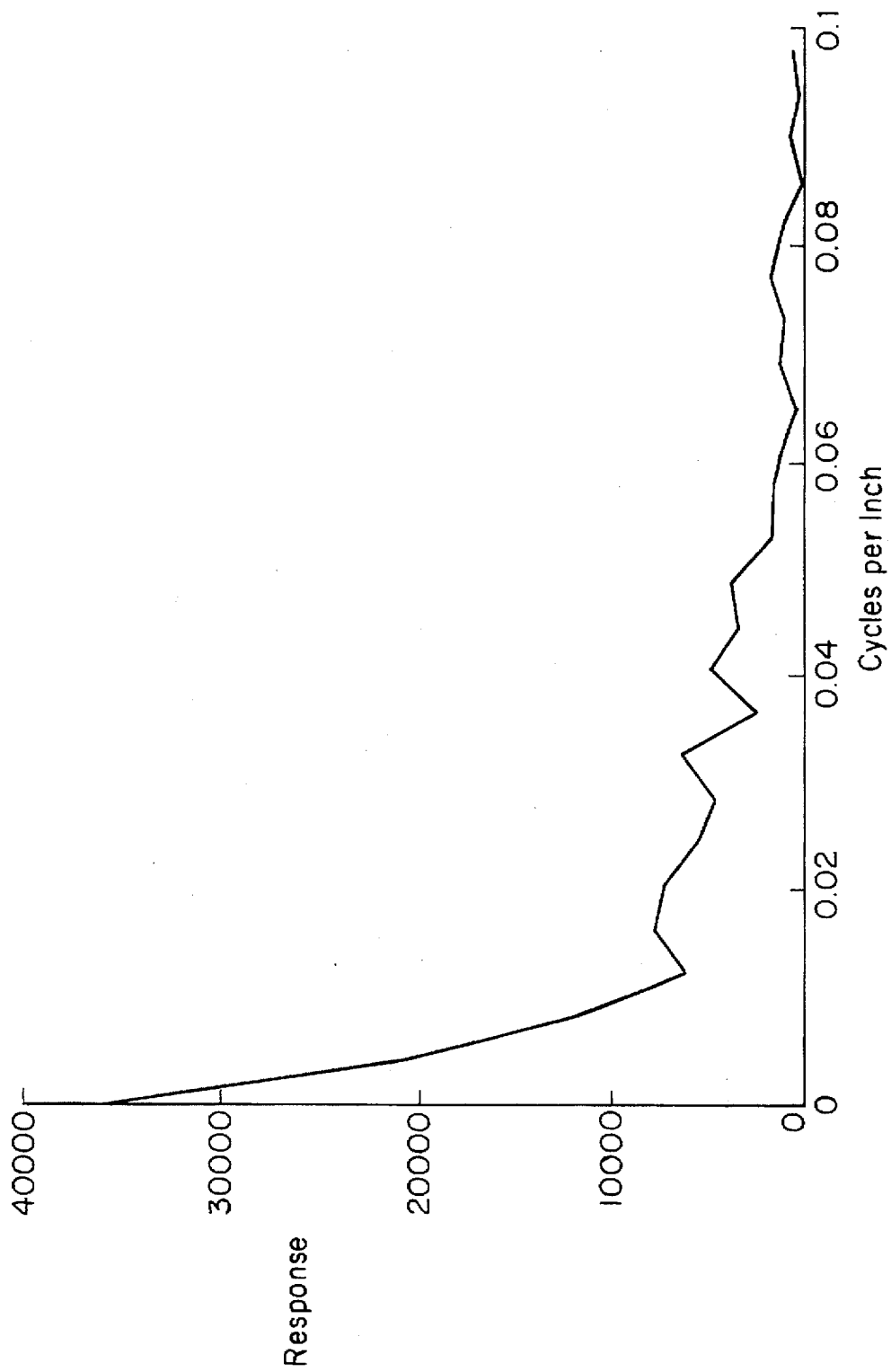
FIGS. 5–10 are intensity spectra for different types of automobiles.
Figure 6:
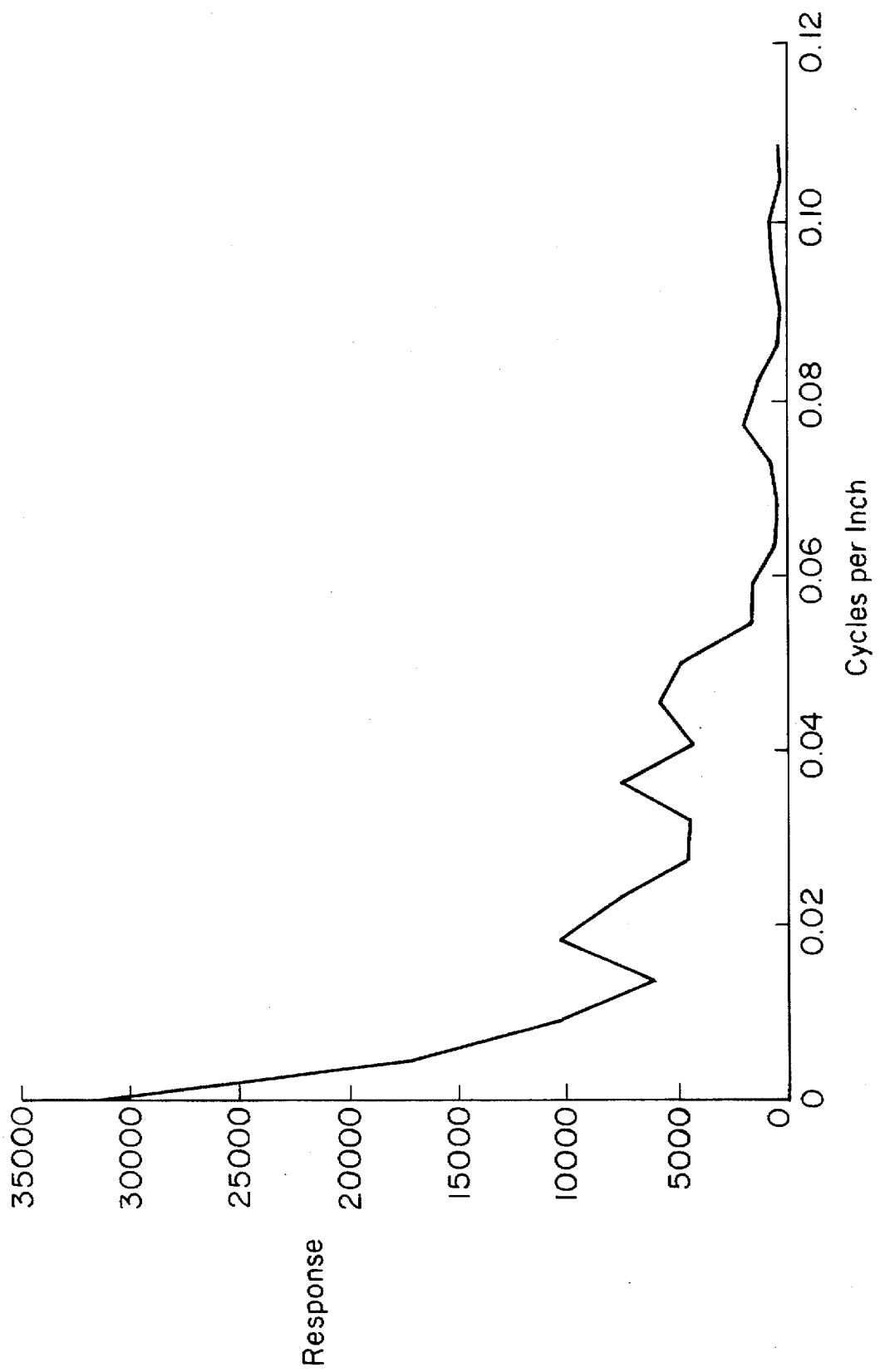
Figure 7:
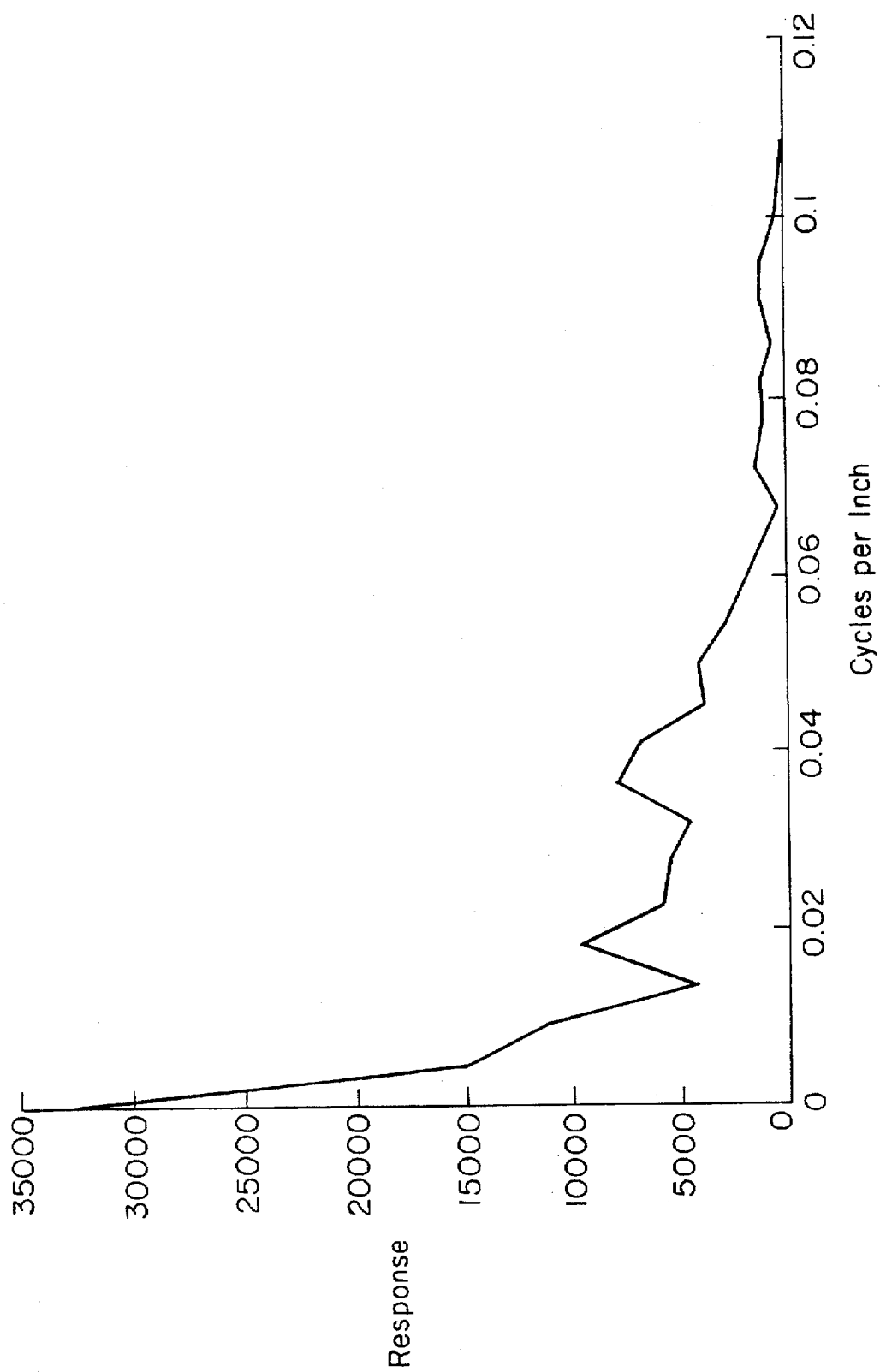
Figure 8:
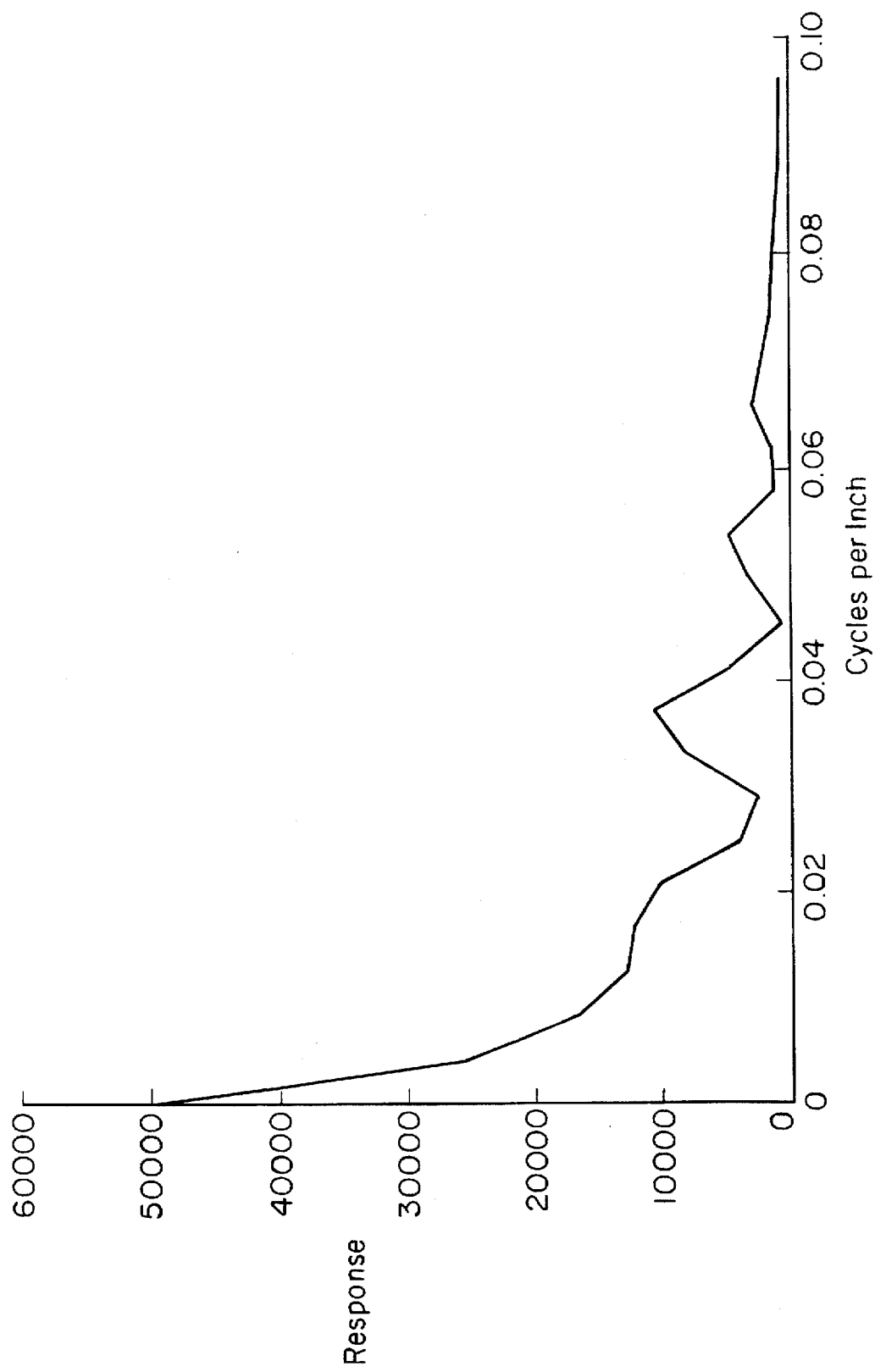
Figure 9:
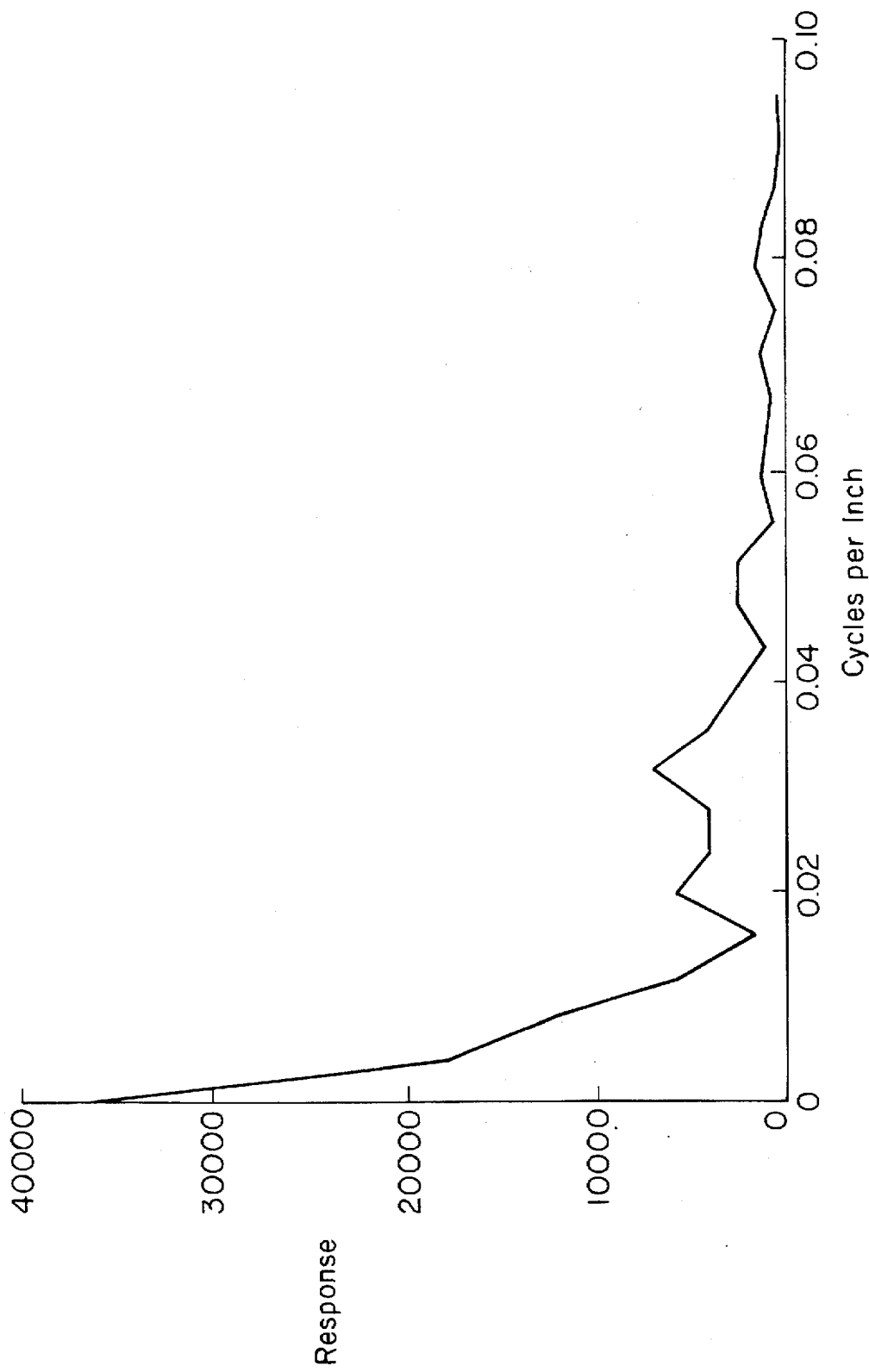
Figure 10:
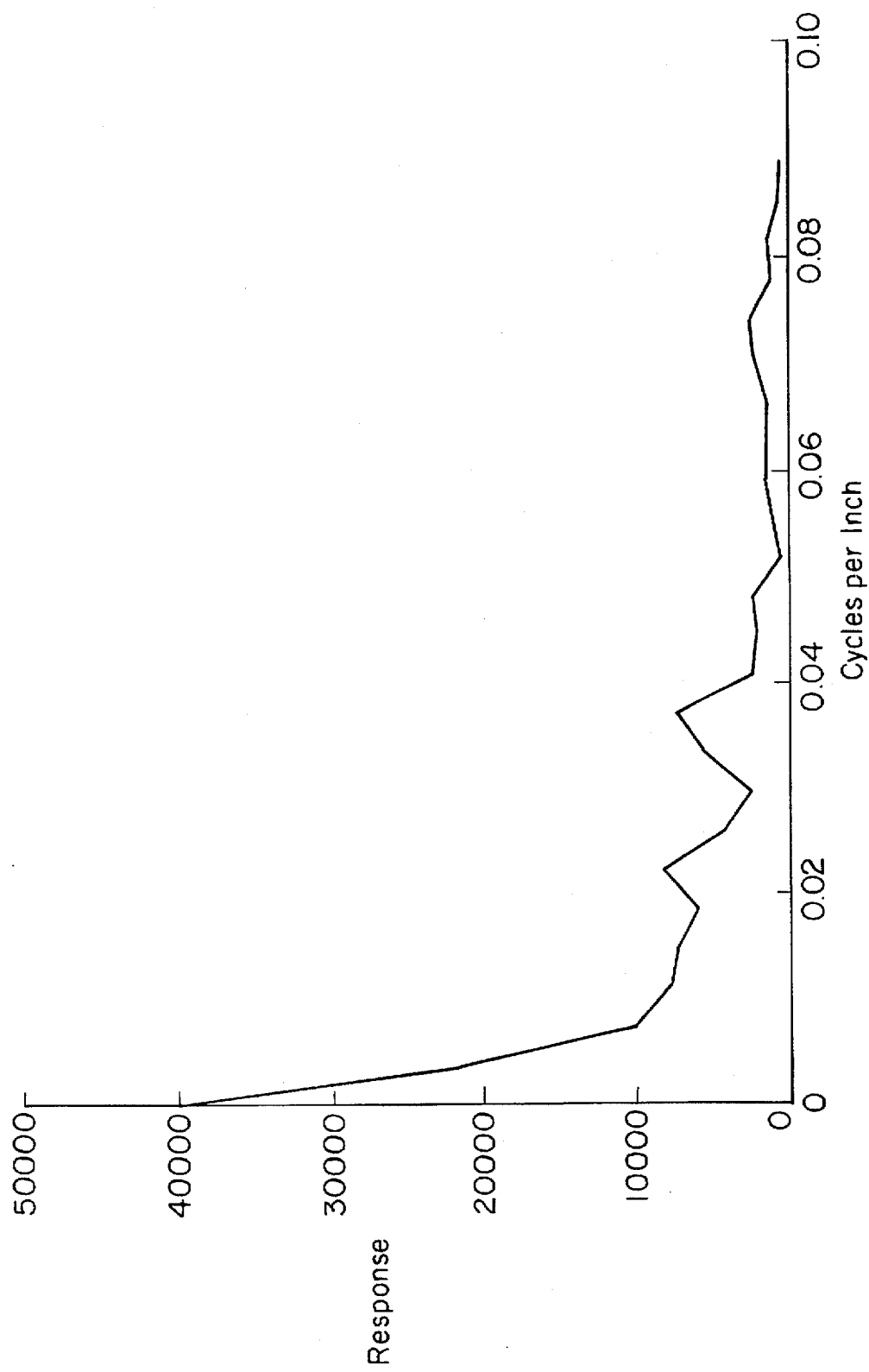

The velocity sensor of the invention need not use a grating to generate the optical signals received by the detectors. FIG. 4 is a schematic illustration of another embodiment 500 of the invention in which a pair of parallel slits is used instead of a grating. As in FIG. 3, a break is shown in the light 208 to illustrate that the light beams entering the system diverge from individual points on the object 202.

The embodiment of FIG. 4 is similar to that of FIG. 3. In FIG. 4, the grating 224 has been replaced with an opaque plate or screen 324 having a pair of parallel slits 325. Light from the slits is directed to the detectors 526a, 526b, 528a, 528b by lenses 230, 240 and 242 and the polarizing beam-splitter 216.

The channel 1 light 217 is directed onto the pair of detectors 528a and 528b, and the channel 2 light is directed onto detectors 526a and 526b. Each detector of a pair receives light from a single slit, and each detector outputs a signal onto a respective output line. The output lines are connected to a delay measuring device 532. As the light moves by the parallel slits, a delay exists between the detector signals on lines 529a and 529b, and a delay exists between the signals on lines 527a and 527b. Each of these delays is inversely proportional to an image velocity. The delay measuring device 532 measures both delays and an image velocity is computed for each channel, either manually or with computer 246. Using distance s, each of the image velocities is used to compute a corresponding angular velocity, and the differential optical path length Δh is used as described above to compute the object velocity.

In one embodiment of the invention, the sensor is used to detect the speed of passing automobiles. To illustrate the automobile sensing application of the invention, a series of experiments performed on automobiles using a single V/H sensor will be described. For the experiment, an ordinary 35 mm camera back was modified so that the ruling could be positioned in the film plane, with a detector directly behind it. The reflex mirror and the view finder allowed the focus to be set. During use, the camera lens was focused exactly as if photographs were being taken, and the shutter was held open for data acquisition. To verify the accuracy of the measurements, the driver of the vehicle read his speedometer while the V/H sensor measured the car's velocity.

As indicated by equation 12, in order for the detectors to produce a signal with a sinusoidal component, the object irradiance distribution must have a non-zero spatial frequency component at the spatial frequency of the ronchi grating. Thus, in order for the sensor to work for detecting automobiles, typical automobiles were first characterized in terms of their spatial spectra. The characterization was performed for several different makes of automobiles, and the resulting spectra are shown in FIGS. 5–10. To obtain the spectra, several photographs of cars were digitized and the Fourier transforms were obtained. The pixel intensity values were summed in the vertical or y direction and the Fourier transform of the resulting one-dimensional function was computed.

Certain features of the spectra are common to all of the plots in FIGS. 5–10. These are the peaks and spectra near the 0.02 and 0.04 cycles per inch, corresponding to periodic structures on the vehicles having spatial periods of about 50 and 25 inches, respectively. Since the 25-inch dimension corresponds roughly to that of the car windows and wheel wells, it is assumed that the peak at 0.04 cycles per inch is due to these features on the car. Furthermore, these dimensions remain fairly constant over a sample of typical cars on the road. Therefore, this peak represents a logical choice for matching to the spatial frequency of the ronchi ruling or grating.

The coarsest ronchi ruling available had a spatial frequency of 1 line per millimeter. Matching a 0.04 cycles per inch object space frequency to this ruling requires an optical demagnification of 1:635. To maintain reasonably small distances in the setup (within about 50–60 feet of the roadway), a short focal length lens was needed. The shortest 35 mm camera lenses available were 20 mm and 28 mm in focal length. The required object distance, h, is then dictated by first order optics:

$$h=\left(\frac{1}{m}-1\right)f, \tag{13}$$

where m is the magnification and f is the focal length of the lens. This equation prescribes object distances 42 and 58 feet for the 20 mm and 28 mm focal length lenses, respectively.

Oscilloscope traces of the detector signals were obtained during the experiment. The temporal frequencies of the signals were determined by noting the time scale on the oscilloscope traces and counting the number of oscillations in a given time period. Converting from temporal frequency to velocity requires geometric parameters. The vehicle's velocity in mi/hr is given by $$v_0 = 0.002237x \frac{v}{mf_0},\qquad(14)$$

where $v$ is temporal frequency in Hz, m is the optical magnification, and $f_0$ is the ruling spatial frequency in lines/mm. The factor of 0.002237 is the conversion from mm/sec to mi/hr.

Signals were obtained using the 28 mm camera lens, at a distance of 30 feet from the roadway, giving a magnification of about 1:325.6. The ronchi ruling had a spatial frequency of 1 line per mm. Plugging these numbers into equation 14 yields the constant of proportionality that is used to multiply frequency to obtain velocity, i.e., $$v_0 = 0.728v.\qquad(15)$$

Frequency measurements were obtained from the oscilloscope traces for several passes of automobiles, and the proportionality relationship of equation 15 was applied to determine the velocities of the automobiles. For example, one particular vehicle yielded a signal at 33 Hz on the oscilloscope. Thus, its velocity sensed by the sensor of the invention was 24.0 mi/hr, which was very close to the value read from the vehicle's speedometer.

The above experiments illustrate that by choosing the appropriate ruling frequency based on the expected spatial frequency of the sensed object, accurate velocity measurements can be obtained at useful distances from the object. These measurements were obtained with a single V/H sensor at a known distance. However, as described in detail above, plural individual velocity measurements can be used according to the present invention to obtain actual object velocities without knowing the absolute distance to the object.

While this invention has been particularly shown and described with references to preferred embodiments thereof, it will be understood by those skilled in the art that various changes in form and details may be made therein without departing from the spirit and scope of the invention as defined by the appended claims.

The invention claimed is:

1. A velocity sensing apparatus for sensing the velocity of a wheeled vehicle comprising:

a first sensor receiving light from the vehicle along a first optical path having a first optical path length, the light having a predetermined intensity spatial frequency component associated with a selected feature of the vehicle, the first sensor comprising:

a first grating having a line frequency selected such that the first grating passes light from the vehicle at the spatial frequency associated with the selected feature of the vehicle, a first detector receiving light passed by the first grating and generating a first signal indicative of motion of the vehicle;

a second sensor receiving the light from the vehicle along a second optical path having a second optical path length, a differential optical path length being defined by a difference between the first and second optical path lengths, the second sensor comprising:

a second grating having the line frequency selected such that the second grating passes light from the vehicle at the spatial frequency associated with the selected feature of the vehicle, a second detector receiving light passed by the second grating and generating a second signal indicative of motion of the vehicle; and a processor coupled to the first sensor and the second sensor, the processor receiving the first signal and generating therefrom a first angular velocity measurement for the vehicle, and receiving the second signal and generating therefrom a second angular velocity measurement for the vehicle, wherein the processor computes an absolute velocity of the vehicle using the differential optical path length and the first and second angular velocity measurements.

2. The velocity sensing apparatus of claim 1 wherein the intensity spatial frequency component associated with the selected feature of the vehicle is about 0.04 cycles per inch.

3. The velocity sensing apparatus of claim 1 wherein the selected feature of the vehicle is a wheel well of the vehicle.

4. The velocity sensing apparatus of claim 1 wherein the first and second sensors comprise velocity/distance quotient (V/H) sensors.

5. A method for sensing the velocity of a wheeled vehicle comprising:

predetermining an intensity spatial frequency component of light associated with a selected feature of the vehicle;

with a first sensor, receiving light from the vehicle along a first optical path having a first optical path length;

providing a first grating having a line frequency selected such that the first grating passes light from the vehicle at the spatial frequency associated with the selected feature of the vehicle;

with a first detector, receiving light passed by the first grating and generating a first signal indicative of motion of the vehicle;

in a processor, receiving the first signal and generating a first angular velocity measurement for the vehicle;

with a second sensor, receiving the light from the vehicle along a second optical path having a second optical path length;

computing a differential optical path length, said differential optical path length being defined by a difference between the first and second optical path lengths;

providing a second grating having the line frequency selected such that the second grating passes light from the vehicle at the spatial frequency associated with the selected feature of the vehicle;

with a second detector, receiving light passed by the second grating and generating a second signal indicative of motion of the vehicle;

in the processor, receiving the second signal and generating a second angular velocity measurement for the vehicle; and in the processor, computing an absolute velocity of the vehicle using the differential optical path length and the first and second angular velocity measurements.

6. A velocity sensing apparatus for sensing the velocity of a wheeled vehicle comprising:

a first sensor receiving light from the vehicle along a first optical path having a first optical path length, the light having an intensity spatial frequency component of about 0.04 cycles per inch associated with a selected feature of the vehicle, the first sensor comprising:

a first grating having a line frequency selected such that the first grating passes light from the vehicle at the spatial frequency associated with the selected feature of the vehicle, a first detector receiving light passed by the first grating and generating a first signal indicative of motion of the vehicle, and a second sensor receiving the light from the vehicle along a second optical path having a second optical path length, a differential optical path length being defined by a difference between the first and second optical path lengths, the second sensor comprising:
- a second grating having the line frequency selected such that the second grating passes light from the vehicle at the spatial frequency associated with the selected feature of the vehicle,
- a second detector receiving light passed by the second grating and generating a second signal indicative of motion of the vehicle; and
- a processor coupled to the first sensor and the second sensor, the processor receiving the first signal and generating a first angular velocity measurement for the vehicle, and receiving the second signal and generating a second angular velocity measurement for the vehicle, wherein the processor computes an absolute velocity of the vehicle using the differential optical path length and the first and second angular velocity measurements.

7. The velocity sensing apparatus of claim 6 wherein the selected feature of the vehicle is a wheel well of the vehicle.

8. The velocity sensing apparatus of claim 6 wherein the first and second sensors comprise velocity/distance quotient (V/H) sensors.

9. A method for sensing the velocity of a wheeled vehicle comprising:
- selecting an intensity spatial frequency component of light at about 0.04 cycles per inch and associated with a selected feature of the vehicle;
- with a first sensor, receiving light from the vehicle along a first optical path having a first optical path length;
- providing a first grating having a line frequency selected such that the first grating passes light from the vehicle at the spatial frequency associated with the selected feature of the vehicle;
- with a first detector, receiving light passed by the first grating and generating a first signal indicative of motion of the vehicle;
- in a processor, receiving the first signal and generating a first angular velocity measurement for the vehicle;
- with a second sensor, receiving the light from the vehicle along a second optical path having a second optical path length;
- computing a differential optical path length, said differential optical path length being defined by a difference between the first and second optical path lengths;
- providing a second grating having the line frequency selected such that the second grating passes light from the vehicle at the spatial frequency associated with the selected feature of the vehicle;
- with a second detector, receiving light passed by the second grating and generating a second signal indicative of motion of the vehicle;
- in the processor, receiving the second signal and generating a second angular velocity measurement for the vehicle; and
- in the processor, computing an absolute velocity of the vehicle using the differential optical path length and the first and second angular velocity measurements.

10. A velocity sensing apparatus for sensing the velocity of a wheeled vehicle comprising:
- a first sensor receiving light from the vehicle along a first optical path having a first optical path length, the light having an intensity spatial frequency component associated with a wheel well of the vehicle, the first sensor comprising:
  - a first grating having a line frequency selected such that the first grating passes light from the vehicle at the spatial frequency associated with the wheel well of the vehicle,
  - a first detector receiving light passed by the first grating and generating a first signal indicative of motion of the vehicle, and
- a second sensor receiving the light from the vehicle along a second optical path having a second optical path length, a differential optical path length being defined by a difference between the first and second optical path lengths, the second sensor comprising:
  - a second grating having the line frequency selected such that the second grating passes light from the vehicle at the spatial frequency associated with wheel well of the vehicle,
  - a second detector receiving light passed by the second grating and generating a second signal indicative of motion of the vehicle; and
- a processor coupled to the first sensor and the second sensor, the processor receiving the first signal and generates a first angular velocity measurement for the vehicle, and receiving the second signal and generating a second angular velocity measurement for the vehicle, wherein the processor computes an absolute velocity of the vehicle using the differential optical path length and the first and second angular velocity measurements.

11. The velocity sensing apparatus of claim 10 wherein the intensity spatial frequency component associated with the selected feature of the vehicle is about 0.04 cycles per inch.

12. The velocity sensing apparatus of claim 10 wherein the first and second sensors comprise velocity/distance quotient (V/H) sensors.

13. A method for sensing the velocity of a wheeled vehicle comprising:
- with a first sensor, receiving light from the vehicle along a first optical path having a first optical path length, the light having an intensity spatial frequency component associated with a wheel well of the vehicle;
- providing a first grating having a line frequency selected such that the first grating passes light from the vehicle at the spatial frequency associated with the wheel well of the vehicle;
- with a first detector, receiving light passed by the first grating and generating a first signal indicative of motion of the vehicle;
- in a processor, receiving the first signal and generating a first angular velocity measurement for the vehicle;
- with a second sensor, receiving the light from the vehicle along a second optical path having a second optical path length;
- computing a differential optical path length, said differential optical path length being defined by a difference between the first and second optical path lengths;
- providing a second grating having the line frequency selected such that the second grating passes light from the vehicle at the spatial frequency associated with the wheel well of the vehicle;
- with a second detector, receiving light passed by the second grating and generating a second signal indicative of motion of the vehicle;
- in the processor, receiving the second signal and generating a second angular velocity measurement for the vehicle; and
- in the processor, computing an absolute velocity of the vehicle using the differential optical path length and the first and second angular velocity measurements.

* * * * *